United States Patent [19]
Steinle

[11] Patent Number: 5,816,663
[45] Date of Patent: Oct. 6, 1998

[54] VEHICLE SEAT BELT AND BODY AND ASSEMBLY

[76] Inventor: James R. Steinle, 102 E. Third St., Greenville, Ohio 45331

[21] Appl. No.: 929,586

[22] Filed: Sep. 15, 1997

Related U.S. Application Data

[63] Continuation-in-part of Ser. No. 801,065, Feb. 14, 1997, abandoned.

[51] Int. Cl.$^6$ .................................................. A47C 31/00
[52] U.S. Cl. ..................................... 297/488; 297/188.01
[58] Field of Search ................................. 297/488, 487, 297/465, 485, 464, 482, 183.1, 188.01, 188.14

[56] References Cited

U.S. PATENT DOCUMENTS 5,120,111  6/1992  Cook ............................... 297/188.01 X
5,527,091  6/1996  Gruber ................................ 297/188.01

*Primary Examiner*—Laurie K. Cranmer
*Attorney, Agent, or Firm*—Barnes, Kisselle, Raisch, Choate, Whittemore & Hulbert

[57] ABSTRACT

A vehicle seat belt and body pad that includes an elongated belt having a latch assembly at one end for removable coupling to the latch plate conventionally provided on a vehicle seat, and a latch plate at the opposing end for removable coupling to a latch assembly conventionally provided on a vehicle seat or a vehicle shoulder harness. An open rectangular pad of resilient construction has one straight side affixed to the belt between the ends of the belt. In the event of an imminent vehicle impact, the pad may be pivoted on the lap of the vehicle occupant upwardly about the elongated dimension of the belt for protective disposition over the abdomen of the vehicle occupant.

17 Claims, 3 Drawing Sheets

VEHICLE SEAT BELT AND BODY AND ASSEMBLY

This application is a continuation-in-part of application Ser. No. 801,065 filed Feb. 14, 1997 now abandoned.

The present invention is directed to safety restraint systems for automotive vehicles and the like, and more particularly to a combined seat belt and body pad for protecting the abdomen of a vehicle occupant in the event of vehicle impact.

BACKGROUND AND SUMMARY OF THE INVENTION

Seat belts and shoulder harnesses are conventionally employed for restraining movement of a vehicle occupant in the event of vehicle impact. It is a general object of the present invention to provide a seat belt and body pad assembly that will provide enhanced protection for a vehicle occupant in the event of impact, and that is adapted to be employed in combination with conventional seat belt and shoulder harness constructions. Another object of the present invention is to provide a seat belt and body pad of the described character that is fully adjustable, that is easy to clean, and that is buoyant so that it may operate as a life preserver in the event of vehicle immersion in water.

A vehicle seat belt and body pad in accordance with a presently preferred embodiment of the invention includes an elongated belt having a latch assembly at one end for removable coupling to the latch plate conventionally provided on a vehicle seat, and a latch plate at the opposing end for removable coupling to a latch assembly conventionally provided on a vehicle seat or a vehicle shoulder harness. An open rectangular pad of resilient construction has one side affixed to the belt between the ends of the belt. The outer edge of this pad side preferably is concave for fitting around the user's abdomen. In the event of an imminent vehicle impact, the pad may be pivoted on the lap of the vehicle occupant upwardly about the elongated dimension of the belt for protective disposition covering the abdomen of the vehicle occupant.

The pad in the preferred embodiment of the invention is permanently and non-adjustably secured to the belt between the belt ends. At least one of, and preferably both the latch assembly and the latch plate on the belt are adjustable with respect to the belt for adjustably positioning the pad centered on the abdomen of the vehicle occupant. The belt is of continuous length and passes through the interior of the pad. The pad preferably has an outer skin of washable composition and an interior of foam composition. The pad preferably is of buoyant construction in water so that it may function as a life preserver in the event of vehicle emersion. The pad preferably has a handle strap extending along the exterior of one side of the pad for user portability, and at least one cup holder is carried by the pad for the user's convenience.

BRIEF DESCRIPTION OF THE DRAWINGS

The invention, together with additional objects, features and advantages thereof, will be best understood from the following description, the appended claims and the accompanying drawings in which:

Detailed Description of Preferred Embodiments

Figure 1:
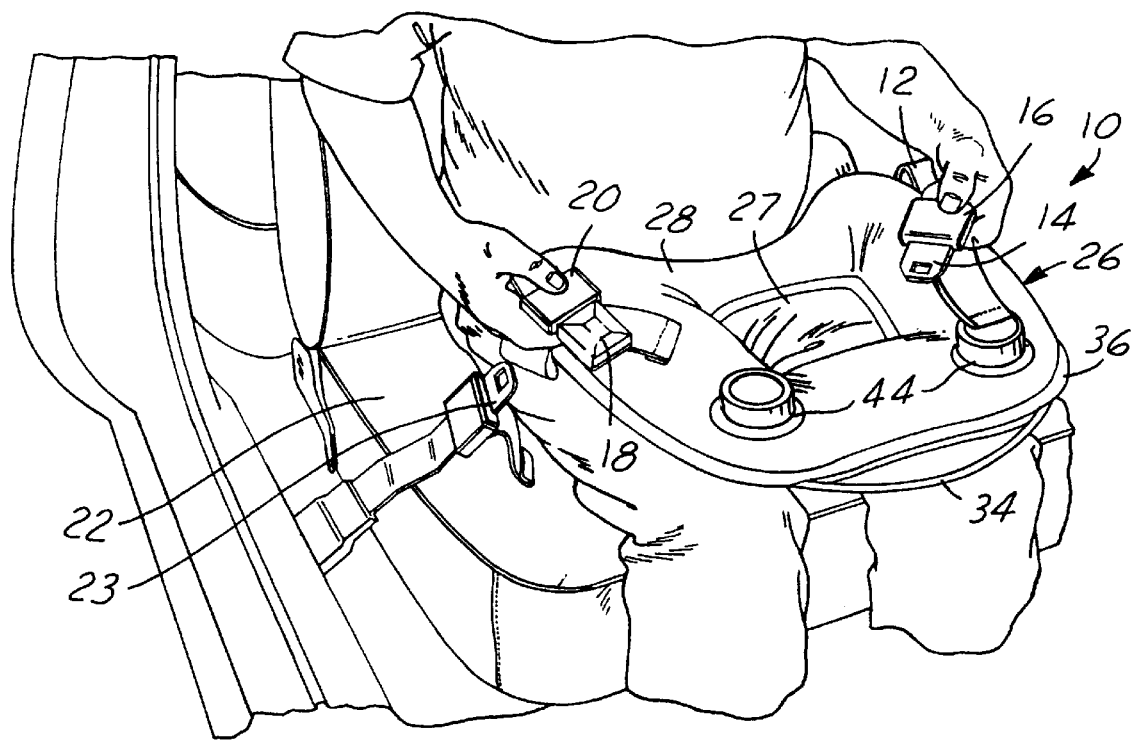
FIG. 1 is a perspective view of a vehicle seat belt and body pad in accordance with a presently preferred embodiment of the invention on the lap of a vehicle occupant and ready for engagement with the vehicle seat belt construction.
Figure 2:
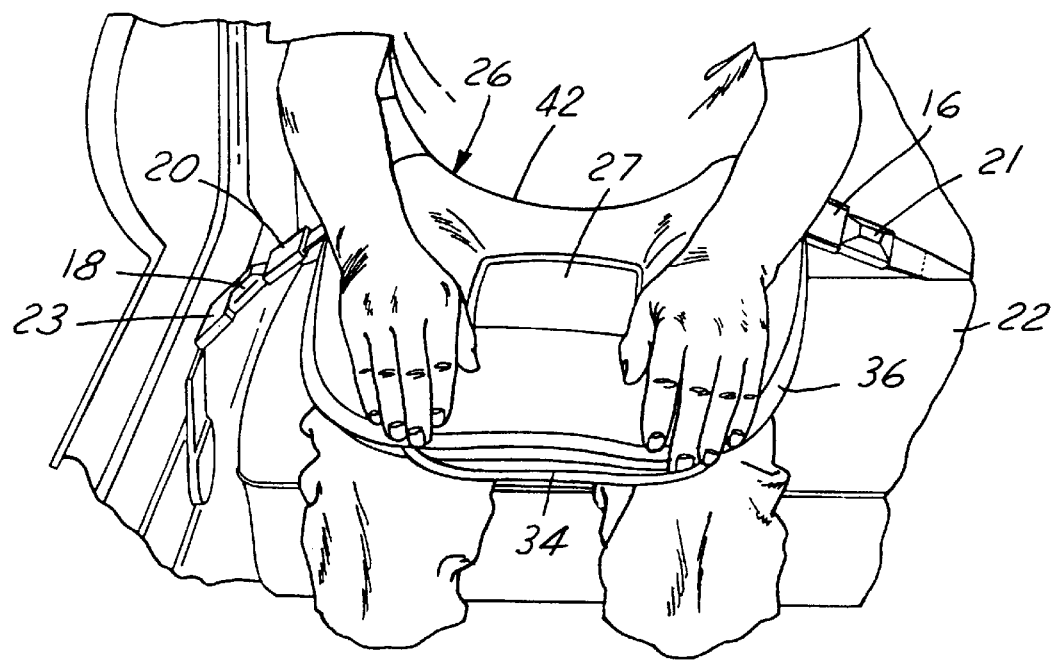
FIG 2 is a perspective view of the pad in FIG. 1 affixed to the vehicle seat belt latch plate and latch assembly.
Figure 3:
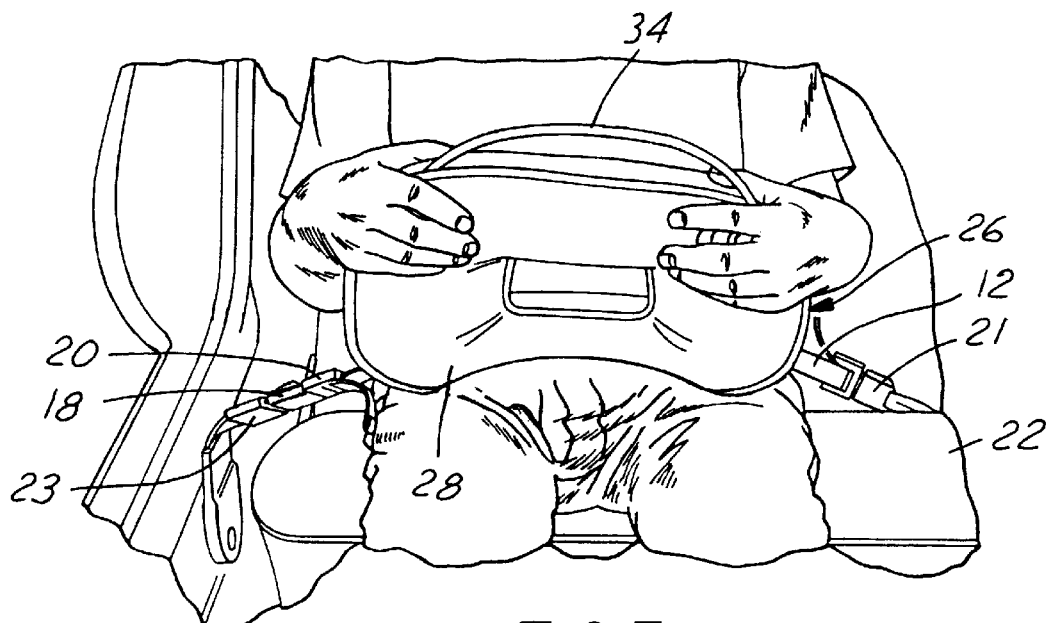
FIG. 3 a perspective view similar to that of FIG. 2 showing the pad partially pivoted upwardly for protecting the occupant's abdomen.
Figure 4:
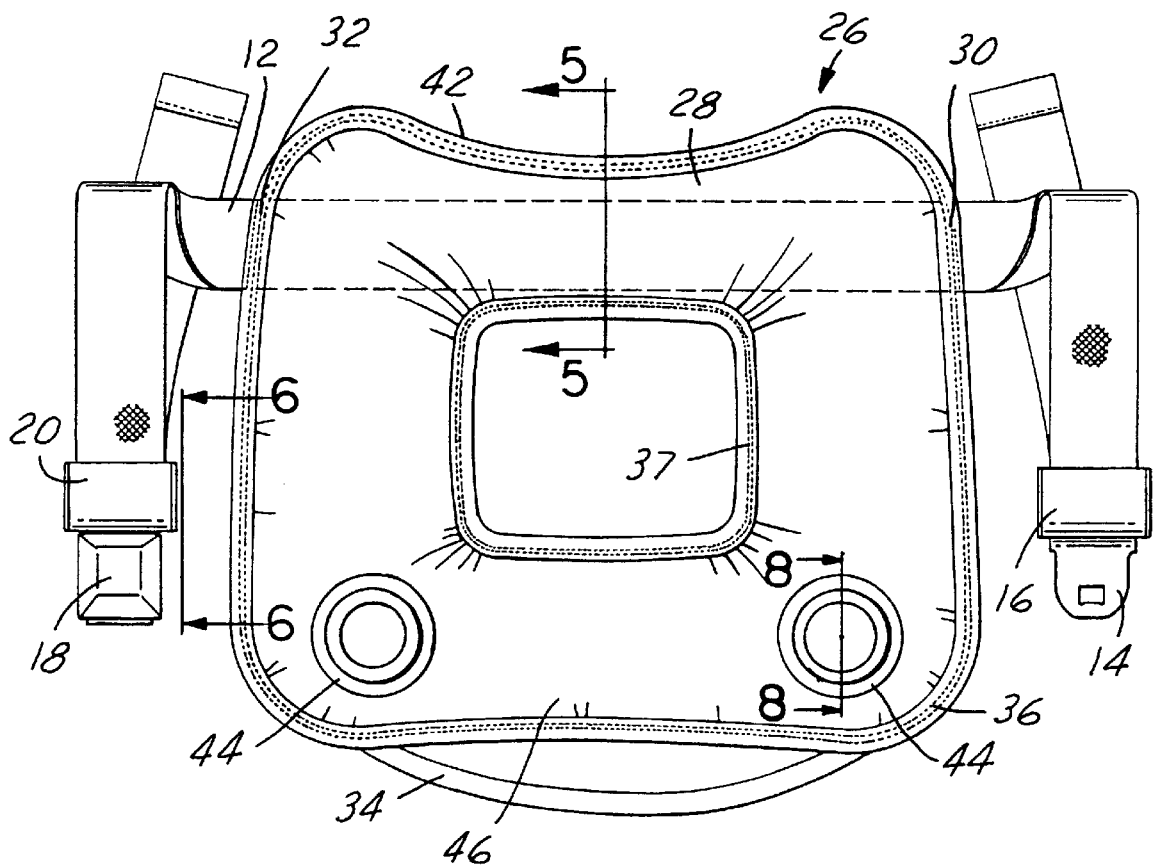
FIG. 4 is a plan view of the seat belt and pad assembly in accordance with the presently preferred embodiment of the invention.
Figure 5:
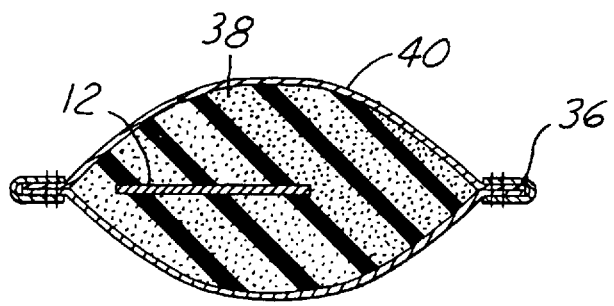
FIGS. 5 and 6 are sectional views taken substantially along the lines 5—5 and 6—6 in FIG. 4.
Figure 6:
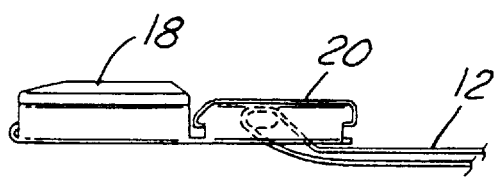
Figure 8:
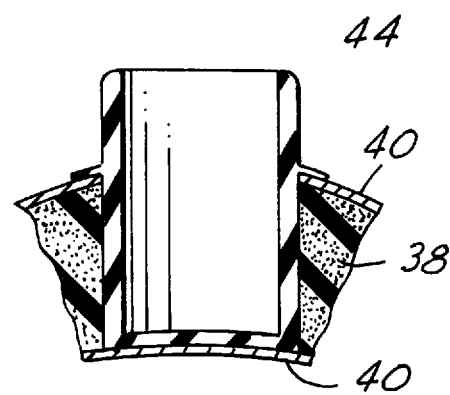
FIG. 8 is a fragmentary sectional view taken substantially along the line 8—8 in FIG. 4.

FIGS. 1–6 and 8 illustrate a vehicle seat belt and body pad assembly 10 in accordance with a presently preferred embodiment of the invention as comprising an elongated belt 12 of one-piece integral construction. Belt 12 may be of conventional woven nylon construction, for example. A latch plate or tongue 14 is adjustably mounted by a slide mechanism 16 at one end of belt 12, while a latch assembly or buckle 18 is adjustably mounted by a slide mechanism 20 at the other end of belt 12. Latch plate 14 and slide mechanism 16 are of conventional construction suitable for removable latching insertion into a latch assembly 21 (FIGS. 2 and 3) conventionally provided on the seat 22 of a vehicle. Latch assembly 18 and slide mechanism 20 are likewise of conventional construction for removable receipt of a latch plate 23 conventionally provided either on a shoulder harness or on a belt segment adjacent to seat 22 as illustrated in FIGS. 1–3. Thus, simply stated, belt 12 including latch plate 14 and latch assembly 18 is constructed for mating engagement with latch assembly 21 and latch plate 23 conventionally provided at each occupant position of an automotive vehicle.

A body pad 26 is provided, preferably in the form of an open rectangle—i.e., a rectangle with an open interior 27. The central portion of belt 12 extends through one straight side 28 of pad 26, being permanently and non-adjustably affixed thereto such as by being stitched to the pad at peripheral positions 30, 32 along the pad exterior seam 36. There is also a pad interior seam 37 around interior 27. Pad 26 preferably comprises a foam interior doughnut 38 surrounded and completely enclosed within an exterior skin 40 of washable vinyl or fabric composition. Skin 40 preferably is impervious to water, and interior 38 preferably is of sufficient buoyancy so that the entire assembly 26 may function as a life preserver in the event of escape of the occupant from an immersed vehicle. A handle 34 preferably takes the form of a strap exteriorly secured to the peripheral seam 36 that extends entirely around pad 26 along the outer side edge remote from the side 28 through which belt 12 extends.

The outside edge 42 of pad side 28 is concave, having an inward arc (i.e., into pad 26) contoured to fit around the lower abdomen of a user. Pads 26 may be provided in different sizes for different uses—e.g, child and adult. A preformed cup-shaped holder 44 of rubber or plastic composition is secured at one or both corners of pad 26 along the side 46 thereof remote from side 28. Holders 44 may be of any suitable geometry for holding beverage cans and the like. In the embodiment illustrated in FIG. 8, the bottoms of holders 44 are adhesively secured to the interior of skin 40 within pad 26. Other suitable securement techniques may be employed.

In use, a vehicle occupant positions himself or herself at a vehicle seat occupant position as illustrated in FIG. 1.

Latch assembly 18 on belt 12 is then secured to latch plate 23 on the vehicle seat or shoulder harness, and latch plate 14 on belt 12 is secured to the latch assembly 21 on the vehicle seat. The free ends of belt 12 are then manipulated with respect to slide mechanisms 16, 20 of latch plate 14 and latch assembly 16 so as to center pad 26 in front of the vehicle occupant. Provision of adjustment slide mechanisms 16, 20 at both ends of belt 12 facilitates such adjustment. Pad 26 may normally rest upon the vehicle occupant's lap as illustrated in FIG. 2. In the event of an imminent vehicle impact, the vehicle occupant may pivot pad 26 about the length of belt 12 upwardly so as to cover and protect the abdomen from impact with an air bag or other portion of the vehicle.

Figure 7:
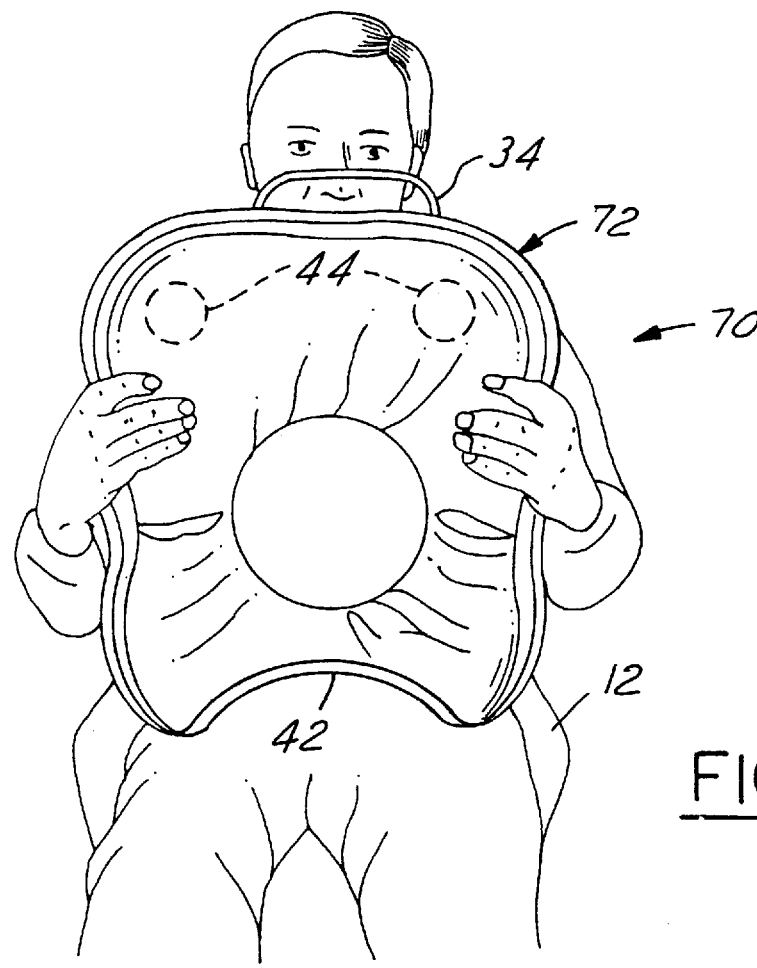
FIG. 7 is a perspective view similar to that of FIG. 3 but showing a modified embodiment of the invention.

FIG. 7 illustrates a modified seat belt and body pad assembly 70 in accordance with the present invention. Whereas pad assembly 10 of FIGS. 1–6 is substantially square, pad 72 of assembly 70 is of elongated rectangular construction. Belt 12 extends through one short side of pad 72 and handle 34 is externally affixed to the opposing short side. Thus, when pad 72 is pivoted upwardly in the event of imminent vehicle impact, it provides protection to the user's face and abdomen from impact with an exploding air bag.

I claim:

1. A vehicle seat belt and body pad that comprises, in combination:
   an elongated belt having a latch assembly at one end for removable coupling to a latch plate on a vehicle seat and latch plate at an opposing end for removable coupling to a latch assembly on a vehicle seat or shoulder harness, and
   a rectangular pad of resilient construction having an open center and one generally straight side affixed to said belt between said ends and being pivotable about said belt for protective disposition over the abdomen of a vehicle occupant in the event of vehicle impact.

2. The vehicle seat belt and body pad set forth in claim 1 wherein said pad is permanently and non-adjustably secured to said belt.

3. The vehicle seat belt and body pad set forth in claim 2 wherein at least one of said latch assembly and said latch plate on said belt is adjustably positionable on said belt for centering said pad in front of a vehicle occupant.

4. The vehicle seat belt and body pad set forth in claim 3 wherein both said latch assembly and said latch plate on said belt are adjustably positionable on said belt.

5. The vehicle seat belt and body pad set forth in claim 2 wherein said belt passes through the interior of said pad along said one side of said pad.

6. The vehicle seat belt and body pad set forth in claim 1 wherein said pad has an outer skin of washable composition and an interior of foam composition.

7. The vehicle seat belt and body pad set forth in claim 1 wherein said pad is of buoyant construction in water.

8. The vehicle seat belt and body pad set forth in claim 1 wherein said rectangular pad has two opposed short sides and two opposed long sides, said one straight side to which said belt is affixed being one of said short sides.

9. The vehicle seat belt and body pad set forth in claim 8 wherein said long sides of said rectangular pad are of sufficient length to at least partially cover the vehicle occupant's face when pivoted.

10. The vehicle seat belt and body pad set forth in claim 1 further comprising a handle on said pad for carrying by a user.

11. The vehicle seat belt and body pad set forth in claim 10 wherein said handle comprises an elongated strap extending along the exterior of one side of said pad.

12. The vehicle seat belt and body pad set forth in claim 1 wherein said one straight side has a generally straight central portion adjacent the belt and a generally concave outer edge for receipt over the lower abdomen of a user.

13. The vehicle seat belt and body pad set forth in claim 12 further comprising at least one cup-shaped pocket in said pad for holding a beverage can.

14. The vehicle seat belt and body pad set forth in claim 13 wherein said at least one cup-shaped pocket is disposed along a side of said pad opposed to said one side.

15. The vehicle seat belt and body pad set forth in claim 14 wherein said at least one cup-shaped holder is disposed at a corner of said pad.

16. The vehicle seat belt and body pad set forth in claim 15 wherein said at least one cup-shaped holder comprises a pair of said holders disposed on opposite corners of said pad remote from said one side.

17. The vehicle seat belt and body pad set forth in claim 1 wherein said rectangular pad is adapted to be disposed on the lap of the vehicle occupant and to be manually pivoted by the vehicle occupant in anticipation of a vehicle impact.

* * * * *